United States Patent [19]

Charles

[11] 4,436,137
[45] Mar. 13, 1984

[54] WINDOW INSULATION SYSTEM

[76] Inventor: Hugh G. Charles, 41 Coed-y-Glyn, Sontley Rd., Wrexham, Clwyd, England

[21] Appl. No.: 364,810

[22] Filed: Apr. 2, 1982

[30] Foreign Application Priority Data

Apr. 4, 1981 [GB] United Kingdom ............... 8110618

[51] Int. Cl.$^3$ .............................................. E06B 9/17
[52] U.S. Cl. .................................. 160/242; 160/268 R
[58] Field of Search ................... 160/238, 242, 368 R, 160/DIG. 7, 268, 241

[56] References Cited

U.S. PATENT DOCUMENTS 1,671,545  5/1928  Reuther ............................... 160/242
3,882,921  5/1975  Sandall ................................ 160/242
4,019,556  4/1977  Selger .................................. 160/238

Primary Examiner—Peter M. Caun
Assistant Examiner—Cherney S. Lieberman
Attorney, Agent, or Firm—Hedman, Casella, Gibson, Costigan and Hoare

[57] ABSTRACT

A thermal insulation system for a window comprising a roller blind carried by a roller blind mechanism which is arranged to be fixed to a window frame above a window to be insulated. The blind is adapted to be detachably connectable to the window frame by means of touch fastener (Velcro) strips carried by the longitudinal side edges and the free transverse edge of the blind and mating touch fastener strips carried by the frame. A mounting mechanism for the roller blind enables it to be selectively displaceable for sealing the upper end of the blind.

5 Claims, 8 Drawing Figures

U.S. Patent   Mar. 13, 1984   Sheet 1 of 3   4,436,137
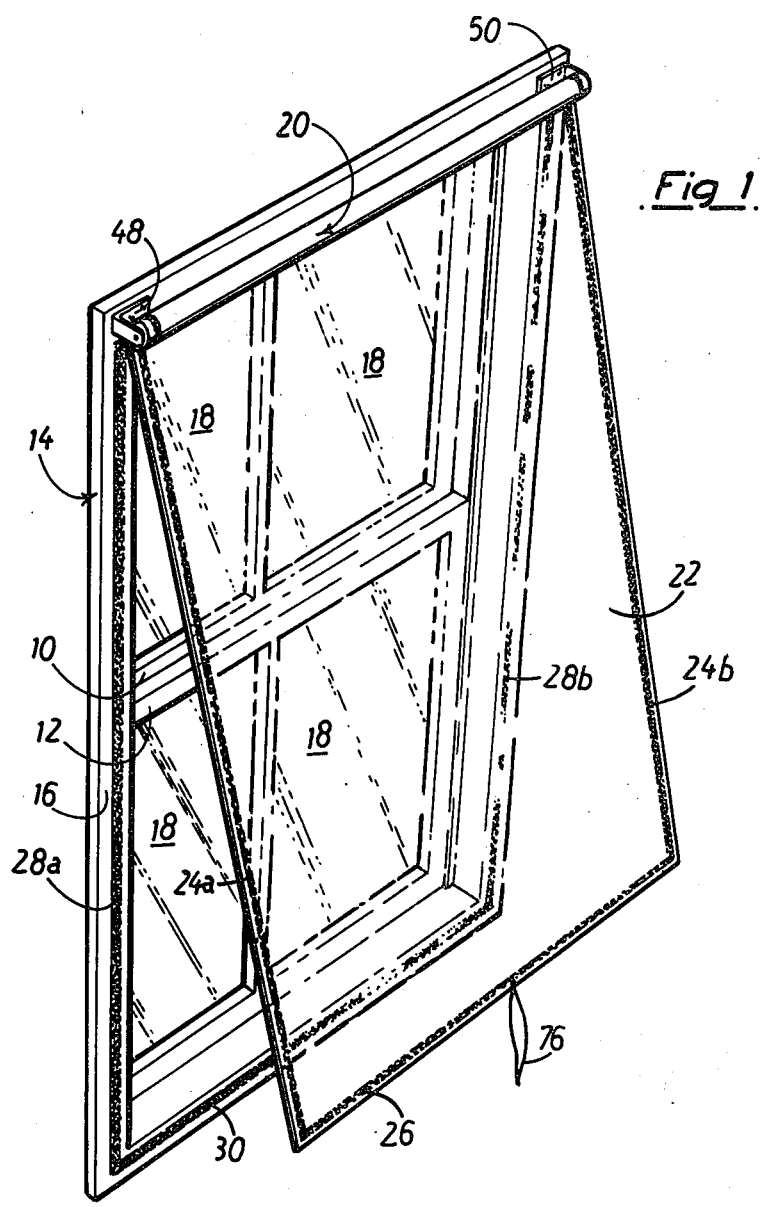
Fig_1
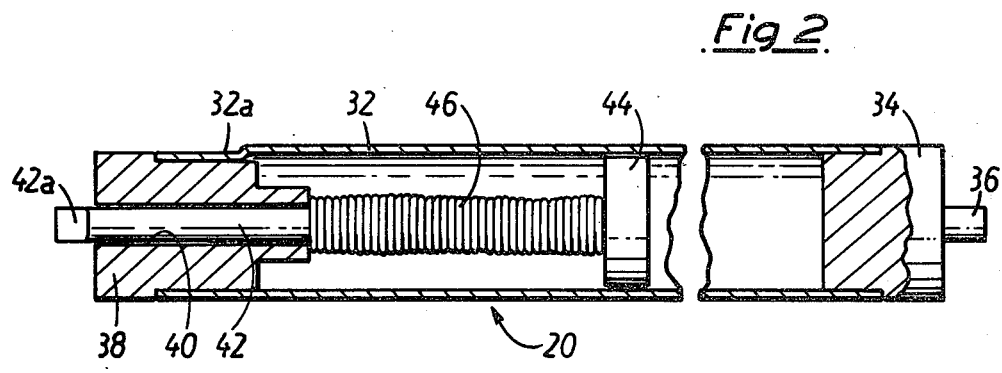
Fig_2

WINDOW INSULATION SYSTEM

DESCRIPTION

The present invention relates to window insulation systems.

One conventional technique for reducing heat loss through windows is to employ so-called primary double glazing, that is to have two panes of glass separated by a small uniform gap which may or may not be evacuated. Usually the two panes of glass are factory assembled in a sealed frame with the space therebetween evacuated during manufacture. This provides an efficient but expensive solution.

A cheaper solution where double glazing is required on an existing window is to fix over the existing window a second glass pane with the requisite gap therebetween. In this case it is not generally possible to achieve evacuation of the gap between the panes. This type of arrangement is known as secondary double glazing.

The latter arrangement has the disadvantages of being relatively bulky and expensive. It is also difficult to provide an efficient seal around the interface between the new panel and the existing window frame.

It is also known to form secondary double glazing using a transparent plastics blind which, when not in use, is stored on a roller mechanism above a window to be insulated. When extra thermal insulation is required, the blind is drawn downwards off the roller so as to cover the window with a small space therebetween. The known system includes an aluminum frame which is fixed over the window and defines vertical guide channels at each side of the window for receiving the side edges of the blind when the latter is extended. In order to attempt to provide a seal between the blind and the frame at the side edges the opposing sides of the channels are fitted with strips of nylon pile between which said side edges of the blind are gripped.

The latter system has, however, several problems in practice, the principal one of which is that the nylon pile arrangement provides only a very inefficient seal around the edges of the blind. Secondly, the system still involves the use of a specially profiled aluminium frame which is expensive to manufacture.

It is an object of the present invention to provide a window insulation system providing effective secondary double glazing which has improved sealing compared with the latter known system and does not require the use of an expensive metal frame.

In accordance with the present invention, there is provided a window insulation system comprising a roller blind carried by a roller blind mechanism adapted to be fixed to a window frame above a window, the blind being adapted to be fixed to the window frame by means of touch fastener strips carried by the longitudinal side edges and the free transverse edge of the blind and mating touch fasteners strips on the frame.

The term "touch fastener" used herein means a fastener of the type sold under the trade name VELCRO having two flexible strips one of which carries a plurality of tiny hooks and the other of which carries a plurality of tiny loops, the arrangement being such that when the hooks and loops are brought together they become interengaged to form an effective join between the two strips and hence between any two members to which the strips are themselves connected.

Preferably, the present system includes a means by which the roller blind mechanism can be selectively displaced between first and second positions corresponding to the blind being in a retractable state and in an operational extended state respectively, the arrangement being such that in moving from said first to said second position the roller blind mechanism is displaced both laterally, to bring its periphery into engagement with a sealing strip extending transversely across the window, and also upwardly to impart a slight tension to at least the upper end of the blind.

The invention is described further hereinafter, by way of example only, with reference to the accompanying drawings, in which:

FIG. 1 is a perspective view showing one embodiment of a window insulation system in accordance with this invention;

FIG. 2 is a longitudinal section through the roller blind mechanism of the system of FIG. 1;

Figure 3:
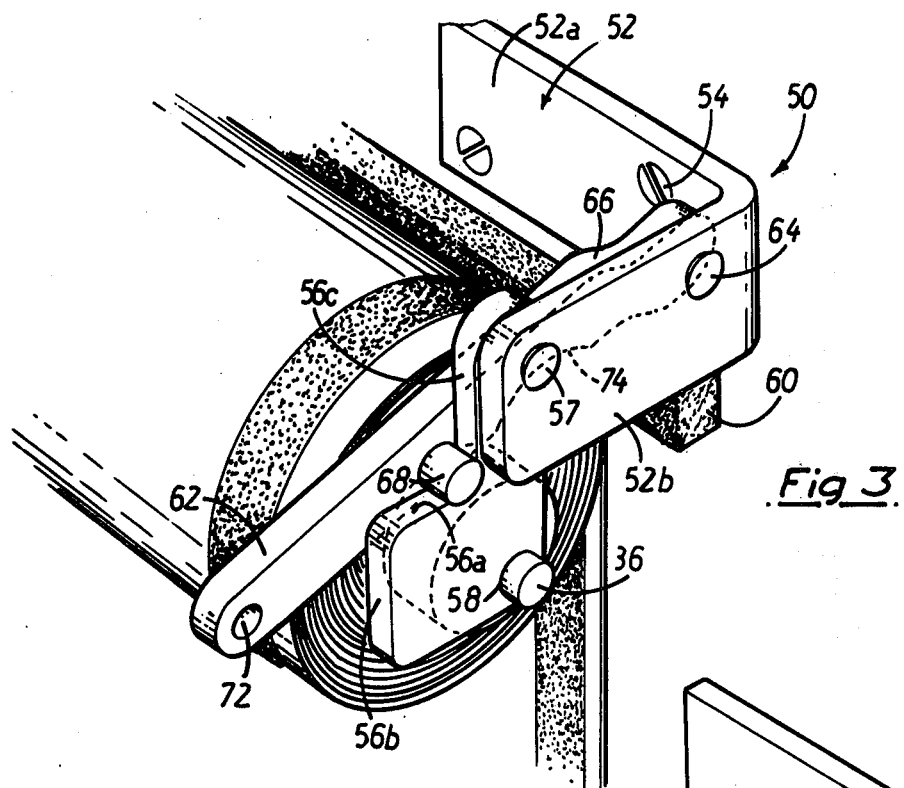
FIGS. 3 and 4 are perspective partial views showing the roller blind mechanism in its two operational positions, respectively.

The illustrated system provides a means of thermally insulating an individual window or a series of adjacent windows by the application to the window or windows of a transparent plastics blind, the arrangement being such that the blind can be drawn off a roller assembly and attached to the window or windows in a manner which provides effective, yet simple, sealing between the window or windows and the blind.

The system can be used in connection with any window or series of windows surrounded by a fixed window frame which provides a flat surface extending around substantially the complete periphery of the window or windows in a plane parallel to the window pane or panes. Such a window is illustrated in FIG. 1 by way of example. This is of a traditional style having a pair of upper and lower wooden frame members 10, 12 which are vertically slidable in a fixed outer wooden frame 14. The frame 14 has a flat peripheral surface 16 which lies on the interior facing side of the frame in a plane parallel to the window panes.

The system includes a roller blind mechanism 20 which is adapted to be mounted on the window frame at a position just above the top of the upper window panes 18 as indicated in FIG. 1. The roller blind mechanism carries a blind 22 of transparent plastics film 22, which is preferably made of the material sold by ICI under the name MELINEX (Registered Trade Mark). The latter material is tough, clear and optically stable. Along each longitudinal edge of the blind 22 which faces the window in the extended state of the blind there is adhered a strip 24a, 24b of plastics tape bearing a plurality of tiny loops which are to form one part of a VELCRO (Trade Mark) type touch fastening. A further strip 26 of this tape bearing the tiny loops is adhered to the leading transverse edge of the blind, again on the side facing the window.

In order to form the other part of the Velcro type fastening, there is attached to the flat surface 16 at each side of the window frame a respective vertical strip 28a, 28b of plastics tape bearing a plurality of tiny hooks. A further, horizontal strip 30 of the latter tape is attached to the frame 16 just below the lower end of the window. The strips 28 and 30 are located and dimensioned so that when the blind is drawn off the roller to substantially its full extent, the two longitudinal strips 24a, 24b and the transverse strip 26 on the blind can be mated with two vertical strips 28a, 28b and the horizontal strip 30 on the frame 16, respectively. By simple manual pressure on the mating surfaces a relatively strong connection can be established between the interengaged hooks and loops on the mating strips and which establishes an effective seal along these three edges between the blind and the window frame. However, when the blind is not required it can be detached easily from its sealing connection with the window frame simply by pulling away the transverse lower end of the blind to break the connection between the strips 26 and 30, and then gradually breaking the connection between the pairs of strips 24, 28 until the blind is free. It can then be allowed to rewind onto the roller mechanism by a spring means described further below.

The arrangement described so far provides an effective seal between the window frame and the blind on three sides. It is important, however, to be able to achieve an effective seal at the fourth edge also, i.e. along the top of the window. This is achieved, as described in detail below, by a special adjusting mechanism for the roller blind which enables the roller carrying the blind to be selectively displaced between two positions corresponding respectively to the blind being in its closed and open positions.

As shown in more detail in FIG. 2, the roller blind mechanism 20 comprises a cylindrical metal tube 32, one end of which receives a solid nylon plug 34 having a central cylindrical spigot 36 lying on the axis of the roller 32. The other end of the tube 32 receives a second nylon plug 38 having a central longitudinal bore 40, the plug 38 being prevented from rotating relative to the tube 32 by forming a flat on the plug which is received in a correspondingly flattened part 32a of the tube 32. Extending through the plug bore 40 is a nylon rod 42, one end of which is fixed to a circular disc 44 and the other end of which, lying outwardly of the plug 38, is formed with a squared section 42a. A helical torsion spring 46 is disposed around the rod 42, one end being fixed to the disc 44 and the other end being fixed to the plug 38. Thus, when the squared end 42a of the rod is held fixed and the tube 32 is rotated about the spindle provided by the rod 42 and the spigot 36, the coil spring is progressively stressed so that when the tube is then released the spring acts to rotate the tube back to its original position.

The roller mechanism of FIG. 2, having the blind 22 wound around it, is mounted in position above the window by means of two bracket assemblies 48,50 disposed at the opposite ends of the roller, respectively. The bracket assembly 50 is shown in more detail in FIGS. 3 and 4 and comprises an L-shaped metal bracket 52 having two or more screw holes 54 in its one limb 52a whereby the bracket can be fitted in its operative position. Pivotally attached to the inside of the other limb 52b is a flat, generally L-shaped metal plate member 56 containing a circular aperture 58 which receives the spigot 36 of the roller mechanism in a freely rotatable manner. The squared end 42a of the rod 42 is non-rotatably received in a correspondingly squared aperture contained in an otherwise identical flat, generally L-shaped metal plate member 56 carried by the other bracket 48 at the opposite end of the roller mechanism. The other bracket assembly 48 at the opposite end of the roller mechanism is thus a mirror image replica of the bracket assembly 50 apart from the squared aperture at the non-illustrated end. The roller mechanism is thus journaled between the two plate members 56 but with the rod 42 non-rotatable relative thereto.

The two members 56 are capable of pivoting on their respective brackets 52 between first positions (corresponding to FIG. 3) wherein the roller mechanism is spaced by some distance from the window frame 16 and second positions (corresponding to FIG. 4) wherein the periphery of the blind 22 carried by the roller mechanism is in engagement with the frame 16. In fact, in order to improve the sealing of the blind at the top of the window, a neoprene strip 60 is adhered to the window frame as shown in FIG. 3 and extends the whole way over the window. In the second position illustrated in FIG. 4, the periphery of the roller blind is in fact brought firmly into positive engagement with this neoprene strip 60, as described further below.

In order to enable the plate members 56, and the roller mechanism carried thereby, to be displaced between said two positions, the limbs 52b of the brackets 52 each carry a respective lever member 62 which is pivotally connected to the associated limb 52b at 64 and is kinked inwardly at 66 so as to enable the lever members to be pivoted about the pins 64 without fouling or interfering with the plate members 56, other than via the interengagement of the spigots 68 with the associated camming surfaces. Each lever 62 carries a respective outwardly extending spigots 68 adapted to slidably engage a pair of approximately mutually peripendicular edges 56a, 56b on the respective plate members 56 which together define a generally L-shaped camming surface.

When the plate member is in its first position corresponding to FIG. 3, the spigots 68 on the levers 62 lie substantially in the apices where the edges 56a meet the edges 56c of the plate members. In this condition the levers 62 extend downwardly at a small angle to the horizontal. If then the free ends of the levers are pulled downwardly, the spigots first ride along the edges 56a and then along the edges 56b until they assume the position shown in FIG. 4. The initial movement along the edges 56a causes the plate members to be rotated about their pivots 57. This results in the roller blind mechanism moving not only horizontally towards the window frame but also slightly upwards relative to the frame. In performing this motion, the periphery of the blind on the roller is brought into sealing engagement with the neoprene strip 60. The secondary movement of the spigots along the edges 56b provides only a small amount of additional pivotal movement of the roller mechanism but serves to lock the roller mechanism in its raised position for maintaining the seal with the neoprene strip 60.

Figure 5A:
FIGS. 5a to 5d are diagrammatic side views illustrading the system in different operational states.
Figure 5B:
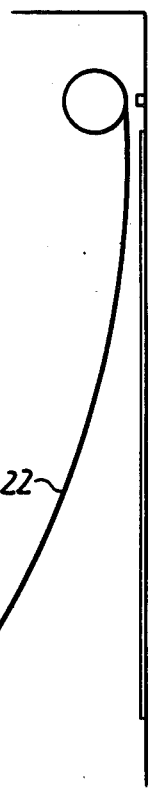
Figure 5C:
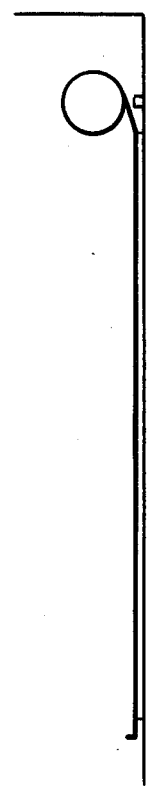

FIGS. 5a to 5d illustrate very diagrammatically the operation of the aforegoing system. When the blind is in its retracted position (FIG. 5a), the plate members 56 and levers 62 occupy their positions as shown in FIG. 3 so that the roller member is spaced from the window frame and the blind 22 can be withdrawn from the roller (FIG. 5b) against the tension provided by the spring 46 which is progressively wound up as the blind is withdrawn. In fact, the spring 46 is arranged to be always in tension even when the roller blind is fully retracted as in FIG. 5a. When the blind has been fully withdrawn to the position of FIG. 5b by manually gripping and pulling downwardly and outwardly on the transverse free end of the blind (it can be provided with an L-shaped plastics strip 70 on its outer edge to aid such manual gripping), it is then brought into a vertical orientation so that the transverse strip 26 bearing the loops mates with the horizontal strip 30 bearing the hooks and the side strips 24a, 24b come into engagement with the strips 28a, 28b. Positive mating of the hooks and loops can be aided by running a finger along the mating strips from bottom to top. The condition of FIG. 5c is thereby attained. The levers 62 are then operated (either one after the other or simultaneously) to swing the roller mechanism upwardly into engagement with the neoprene strip 60. Not only does this action serve to effect sealing of the upper end of the window but it also has the effect of tensioning the upper end region of the blind since this latter region of the blind is slightly stretched in bringing the roller to the position of FIG. 5d. This tension is used to advantage when the blind is subsequently to be retracted since as soon as the levers 62 are pivoted back to their FIG. 3 positions the resilience of the tensioned blind material returns the plate members 56, and hence the roller mechanism, back to the FIG. 3 position whereby the spring can then wind the blind back onto the roller.

Preferably, the blind 22 is slightly pre-tensioned even when in the fully retracted position of FIG. 5a.

In a small, low-down window the levers 62 can be operated directly by hand. When these levers are not accessible directly, they can be operated by engaging a suitable hook on a pole into an aperture 72.

Figure 4:
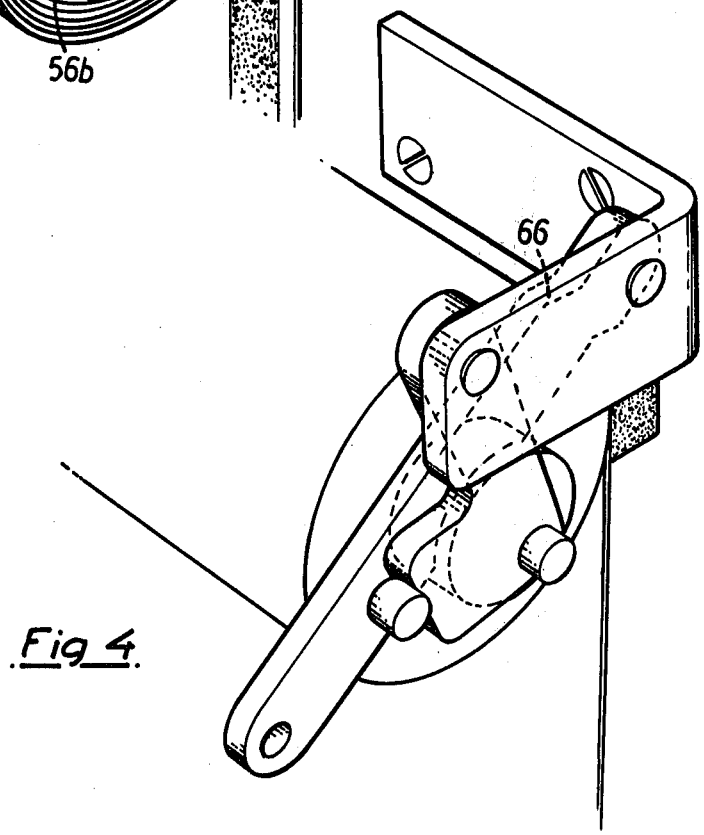
Figure 5D:

Advantageously, the underside edge of the levers 62 can have a part-circular recess 74 which is arranged to engage on the periphery of the nylon plug 34 and/or the plug 38 to assist in locking the roller assembly in its position illustrated in FIG. 5d (see FIG. 4).

Instead of using screws to fix the brackets 50 in position, the brackets can be mounted against opposed facing side walls of a window recess by means of an elongate bar which extends across the window recess and carries a jack at one or both ends which can be extended by a spanner to clamp the brackets against said facing walls. This method of fixing can be used, for example, when it is not practicable to use conventional screws or if a very simple fixing technique is required.

The aforegoing window insulation system acts to provide efficient secondary double glazing in a particularly easy and inexpensive manner. The combination of glass/air space/Melinex in this configuration has been found to provide a U value which compares favourably with conventional double glazed systems.

Although described above using clear transparent Melinex for the material of the blind, this is not essential and other suitable materials could be used.

For pulling the lower transverse strip 26, there may be provided a string 76.

The Velcro system has been described with the loops on the blind and the hooks on the frame but clearly this could be reversed.

In order to strengthen the longitudinal side edges of the blind, there can be provided on the surface opposite to that carrying the Velcro strips 24a, 24b further plain plastics strips (not shown in the drawings) which can lie directly opposite the strips 24a, 24b.

I claim:

1. A window insulation system for thermally insulating a rectangular window assembly comprising:
   (a) a roller blind mechanism carrying a transparent plastics blind;
   (b) means for mounting said roller blind mechanism to a window frame above said window assembly;
   (c) VELCRO strip means on the longitudinal side edges and free transverse edge of said blind;
   (d) mating VELCRO strip means on the frame around the vertical side edges and the horizontal lower edges thereof; and
   (e) means enabling the roller blind mechanism to be displaced on said mounting means between a first position, in which the roller blind mechanism is spaced from the frame to enable the blind to be retracted and extended, and a second position wherein the roller blind periphery is in sealing engagement with said frame above said window assembly, the latter means comprising:
   (1) respective camming means pivotally interconnected with said mounting means at the opposite ends of the roller blind mechanism,
   (2) said camming means each including a pair of camming surfaces which are approximately mutually perpendicular;
   (3) means journaling said blind mechanism between the two camming means;
   (4) lever means pivotally interconnected with said mounting means; and
   (5) cam follower means carried by said lever means and engaging said camming surfaces said cam followers comprise a projection on each of said lever means.

2. A window insulation system comprising:
a roller blind mechanism carrying a transparent plastics blind;
means for mounting said roller blind mechanism to a window frame above a window to be thermally insulated;
first touch fastener strip means on the longitudinal side edges and the free transverse edge of said blind;
second touch fastener strip means on the frame positioned to mate with said first touch fastener strip means for selectively attaching the blind to said window frame; and
resilient strip means disposed across the window frame above said window,
said roller blind mechanism mounting means comprising:
(a) a pair of bracket means adapted to be fixed adjacent to said window frame;
(b) a pair of plate members respectively pivotably connected to said pair of bracket means, the roller blind mechanism being journaled between said pair of plate members;
(c) a pair of lever means respectively pivotally connected to said pair of bracket means;
(d) substantially L-shaped camming surfaces on said plate members; and
(e) cam followers on said lever means which engage said camming surfaces on said plate members, said cam followers comprise a projection on each said lever means; whereby relative displacement of said cam followers on said camming surfaces by angular displacement of said lever means causes the roller blind mechanism to be displaced between a first position, in which the roller blind mechanism is spaced from the frame to enable the blind to be retracted and extended against the tension of a rewind spring within said mechanism, and a second position wherein the roller blind periphery engages said resilient strip means to provide sealing at the upper end of the blind.

3. A window insulation system according to claim 3 wherein one leg of said L-shaped camming surfaces provides angular displacement of the roller blind mechanism and the other leg serves primarily to lock the roller blind mechanism in said second position.

4. A window insulation system according to claim 3 wherein said levers each include a curved recess for engaging the periphery of the roller blind mechanism when the latter mechanism is in said second position.

5. A window insulation system according to claim 1 wherein, upon relative displacement of the cam follower means and said camming means by actuation of said lever means, one of said mutually perpendicular camming surfaces provides for angular displacement of the roller blind mechanism and the other surface serves primarily to lock the roller blind mechanism in said second position.

* * * * *